US006658447B2

(12) United States Patent
Cota-Robles (10) Patent No.: US 6,658,447 B2
(45) Date of Patent: *Dec. 2, 2003

(54) PRIORITY BASED SIMULTANEOUS MULTI-THREADING

(75) Inventor: Erik Cota-Robles, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,795

(22) Filed: Jul. 8, 1997

(65) Prior Publication Data

US 2001/0056456 A1 Dec. 27, 2001

(51) Int. Cl.[7] .................................................. G06F 9/00
(52) U.S. Cl. ........................ 709/103; 712/215; 712/220
(58) Field of Search ................................ 709/103, 102; 712/215, 21, 23, 228, 220, 41, 205, 214

(56) References Cited

U.S. PATENT DOCUMENTS

| | | | | |
|---|---|---|---|---|
| 3,728,692 A | * | 4/1973 | Fennel, Jr. ................... | 712/205 |
| 3,771,138 A | * | 11/1973 | Celtruda et al. ............ | 712/205 |
| 4,642,756 A | * | 2/1987 | Sherrod ....................... | 709/103 |
| 5,303,382 A | * | 4/1994 | Buch et al. .................. | 710/244 |
| 5,361,337 A | * | 11/1994 | Okin ........................... | 711/140 |
| 5,440,752 A | * | 8/1995 | Lentz et al. ................. | 710/123 |
| 5,487,170 A | * | 1/1996 | Bass et al. ................... | 710/244 |
| 5,600,837 A | * | 2/1997 | Artieri ......................... | 709/103 |
| 5,617,545 A | * | 4/1997 | Ogata et al. ................. | 710/116 |
| 5,627,982 A | * | 5/1997 | Hirata et al. ................. | 712/206 |
| 5,754,800 A | * | 5/1998 | Lentz et al. ................. | 710/116 |
| 5,784,618 A | * | 7/1998 | Toutonghi ................... | 709/107 |
| 5,867,725 A | * | 2/1999 | Fung et al. .................. | 712/23 |
| 6,061,710 A | * | 5/2000 | Eickemeyer et al. ........ | 709/107 |
| 6,073,159 A | * | 6/2000 | Emer et al. ................. | 709/103 |
| 6,076,157 A | * | 6/2000 | Borkenhagen et al. ...... | 709/108 |
| 6,105,051 A | * | 8/2000 | Borkenhagen et al. ...... | 709/100 |
| 6,105,127 A | * | 8/2000 | Kimura et al. .............. | 712/205 |
| 6,212,544 B1 | * | 4/2001 | Borkenhagen et al. ...... | 709/102 |

OTHER PUBLICATIONS

Black, David L.. "Scheduling and Resource Management Techniques for Multiprocessors", Carnegie Mellon University, pp. 1–20, 7/90.*
Powell, M.L. "SunOS Multi–thread Architecture", Usenix Winter '91, pp. 1–14, 1991.*
Pham, Thuan Q. "Multithreaded Programming with Windows NT", Chapter 2: Windows NT Thread Interface, pp. 19–48, 1996.*
Fields et al. "Using Priority to Increase Throughput of Explicitly Parallel Applications on SMT." Internet.*
Balbastre et al."Integrated Dynamic Priority Scheduler for RTLinux." Internet.*

(List continued on next page.)

Primary Examiner—John Follansbee
Assistant Examiner—Lewis A. Bullock, Jr.
(74) Attorney, Agent, or Firm—Blakely, Sokoloff, Taylor & Zafman LLP (57) ABSTRACT

A simultaneous multi-threaded architecture combines OS priority information with thread execution heuristics to provide dynamic priorities for selecting thread instructions for processing. The dynamic priority of a thread is determined by adjusting a heuristic measure of the thread's execution dynamics with a priority-dependent scaling function determined from the OS priority of the thread. An SMT processor includes logic for calculating a scaling function for each thread scheduled on the processor, tracking the threads' heuristics, and combing the scaling function and heuristic information into a dynamic priority for each thread. Instructions are selected for execution from among the scheduled threads according to the threads' dynamic priorities.

17 Claims, 5 Drawing Sheets

OTHER PUBLICATIONS

Fiske, Stuart et al. "Thread Prioritization: A Thread Scheduling Mechanism for Multiple–Context Parallel Processors." Jan. 1995.*

Susan J. Eggers, et al. "Simultaneous Multithreading: A Platform for Next–generation Processors", Dept. of Computer Science and Engineering, Seattle Washington, pp. 1–15.

Jack L. Lo, et al. "Compilation Issues for a Simultaneous Multithreading Processor", Department of Computer Science & Engineering, University of Washington, pp. 1–2.

Jack L. Lo, et al., "Converting Thread–Level Parallelism to Instruction–Level Parallelism via Simultaneous Multithreading", Dept. of Computer Science and Engineering, Seattle Washington, pp. 1–25.

D. M. Tullsen, et al., "Simultaneous Multithreading: Maximizing On–Chip Parallelism", Proceedings from the 22nd Annual International Symposium on Computer Architecture, Santa Margherita Ligure, Italy, Jun., 1995, pp. 1–12.

D.M. Tullsen, et al. "Exploiting Choice: Instruction Fetch and Issue on an Implementable Simultaneous Multithreading Processor", Proceedings, of the 23rd Annual International Symposium on Computer Architecture, Philadelphia, PA, May, 1996, pp. 1–12.

W. Yamamoto, "Increasing Superscalar Performance Through Multistreaming", Proceedings of the IFIP WG10.3 Working Conference on Parallel Architectures and Compilation Techniques (PACT'95), pp. 49–58.

Susan J. Eggers, et al. "Simultaneous Multithreading: A Platform for Next–generation Processors", Dept. of Computer Science and Engineering, Seattle Washington, pp. 1–15.

Jack L. Lo, et al. "Compilation Issues for a Simultaneous Multithreading Processor", Department of Computer Science & Engineering, University of Washington, pp. 1–2.

Jack L. Lo, et al., "Converting Thread–Level Parallelism to Insruction–Level Parallelism via Simultaneous Multithreading", Dept. of Computer Science and Engineering, Seattle Washington, pp. 1–25.

D. M. Tullsen, et al., "Simultaneous Multithreading: Maximizing On–Chip Parallelism", Proceedings from the 22nd Annual International Symposium on Computer Architecture, Santa Margherita Ligure, Italy, Jun., 1995, pp. 1–12.

D. M. Tullsen, et al. "Exploiting Choice: Instruction Fetch and Issue on an Implementable Simultaneous Multithreading Processor", Proceedings of the 23rd Annual International Symposium on Computer Architecture, Philadelphia, PA, May, 1996, pp. 1–12.

W. Yamamoto, "Increasing Superscalar Performance Through Multistreaming", Proceedings of the IFIP WG10.03 Working Conference on Parallel Architectures and Compilation Techniques (PACT'95), pp. 49–58.

* cited by examiner

PRIORITY BASED SIMULTANEOUS MULTI-THREADING

BACKGROUND OF THE INVENTION

1. Technical Field

This invention relates to the field of microprocessors and, in particular, to systems and methods for selecting instructions for execution in simultaneous multi-threaded processors.

2. Background Art

The operating system (OS) regulates access to a computer's central processing unit ("processor") by different programs running on the computer. Most OSs employ priority-based scheduling algorithms for this purpose. Priorities are typically assigned to programs according to the importance and/or urgency of the functions they perform on behalf of the computing system. The OS uses these priorities to determine when and for how long a program or a unit of executable code within the program (hereafter, "thread") is granted access to the processor. Generally, priority-based scheduling allocates processor time to optimize the computer system's performance by, for example, minimizing response time to user input, maximizing throughput, and/or guaranteeing predictable (deterministic) execution times for application programs.

Once the OS schedules a thread for execution, most processors simply execute instructions in the thread as rapidly as possible. Execution proceeds until all instructions in the thread have been executed or the OS suspends the thread to execute instructions from another thread. Different processor architectures employ different strategies to speed thread execution, including executing multiple instructions on each cycle of the processor clock. For example, wide issue superscalar processors are designed to identify sequential instructions within a thread that can be executed in parallel, i.e. simultaneously. Symmetric multi-processor (SMP) systems include multiple processors, each of which executes instructions from a thread assigned to it by the OS according to its priority scheme. Provided the instructions from different threads do not interfere with each other, they can be executed parallel. The individual processors of an SMP system may or may not be wide issue superscalar processors.

As noted above, OSs periodically suspend executing threads and replace them with different threads in response to I/O, user, or system input. In most processor architectures, switching to a different thread requires saving the processor state produced by the last instruction executed in the current thread and replacing it with the processor state produced by the last instruction executed in the different thread. The processor state, which is also known as the hardware context of a thread, includes thread-specific data, instructions, and status information that is updated on each clock cycle.

Thread context switches are often used to hide latencies, such as slow memory accesses, in an executing thread. That is, a new thread is given control of the processor while data is retrieved from memory for the previously executing thread. However, context switches can be time-consuming in their own right. Fine-grained multi-threaded (MT) processors are designed to speed switching between different threads and their associated contexts.

A common feature of the above described processor architectures is that each processor executes one thread at a time. Since these threads are scheduled onto the processor by the OS, the priority-based scheduling of the OS is preserved.

Simultaneous multithreading (SMT) processors allow threads from multiple hardware contexts to execute simultaneously on a single processor. The OS schedules multiple threads onto an SMT processor, and on each clock cycle, the SMT processor selects instructions for execution from among the scheduled threads. For example, an 8-issue SMT processor, i.e. a processor capable of issuing up to 8 instructions per clock cycle, has 8 instruction slots that can be filled on each clock cycle. The SMT processor selects these instructions from different threads scheduled by the OS. Selection is made using a variety of heuristics to identify the best, e.g. most efficient, instructions for processing. The potential advantages of SMT architectures are discussed, for example, in Lo et al. "Converting Thread-Level Parallelism To Instruction-Level Parallelism Via Simultaneous Multithreading", available at www.cs.washington.edu/research/smt/index.html #publications.

With an SMT processor architecture, OSs can schedule onto a processor concurrently threads that have different priorities. Because SMT processors select instructions from among threads with different priorities, they can have a substantial impact on the rate at which a particular thread executes. In general, the heuristics employed to select instructions from among the different scheduled threads are designed to maximize the total instruction throughput of the processor. There is no guarantee that these heuristics preserve the priority-based scheduling implemented by the OS. In fact, the heuristics may actually subvert the thread priorities that the OS attempts to enforce. These heuristics are discussed, for example, in Tullsen, et al., "Exploiting Choice: Instruction Fetch and Issue on an Implementable Simultaneous Multithreading Processor", Proceedings of the $23^{rd}$ Annual International Symposium on Computer Architecture, Philadelphia, Pa., May, 1996.

One attempt to reflect the OS priorities of threads in SMT processors simply assigns priorities to different thread contexts, e.g. the registers and memory locations used to track processor states for a thread, and assigns the highest priority context to the thread with the highest OS priority. This static assignment strategy ensures rapid execution of the highest priority thread, but it ignores execution dynamics that impact the overall processor efficiency and reduces the opportunities for execution of parallel instructions. This strategy is also incompatible with OSs that support SMP, since it can lead to livelock. For example, the thread assigned to the high priority context spins (busy waits) on a spin lock that is held by the thread executing in the low priority context. The high priority thread, i.e. the thread operating in the high priority context, prevents the low priority thread from executing any instructions, including those necessary to remove the spin lock.

SUMMARY OF THE INVENTION

The present invention is an SMT processor architecture that combines thread execution heuristics with OS priorities to provide a dynamic priority for each thread scheduled on an SMT processor. Thread execution heuristics, based on efficiency or other criteria, are adjusted by a priority-dependent scaling function, coupling the OS scheduling policy to the SMT processor's thread selection. This ensures that instructions from higher priority threads are executed as quickly as possible without significantly reducing the total instruction throughput of the processor.

In accordance with the present invention, an instruction from a thread that is characterized by a priority is selected for processing by monitoring an indication of the execution state of the thread, adjusting the indication according to a scaling factor determined from the thread priority, and selecting the instruction for processing according to the priority-adjusted indication.

In one embodiment of the present invention, the execution state indication is a per thread counter that tracks events related to the efficiency of thread execution. These events include, for example, the number of outstanding branch code instructions the thread has in the processor pipeline, the number of outstanding data cache misses for a thread, and the number of outstanding instructions the thread has in the pipeline.

In another embodiment of the invention, the scaling function may be a linear or log function of the thread priority or an anti-linear or anti-log function of the priority, according to whether the scheduling priority increases or decreases with increasing thread priority.

BRIEF DESCRIPTION OF THE DRAWINGS

The present invention is illustrated by way of example in the following drawings in which like references indicate similar elements. These drawings disclose various embodiments of the invention for purposes of illustration only and are not intended to limit the scope of the invention.

DETAILED DESCRIPTION OF THE INVENTION

Multi-threaded OSs employ priority based scheduling algorithms to regulate access to the processor by different programs and maintain overall system performance. For example, the Windows NT™ OS of Microsoft® Corporation defines two classes of priorities, real-time and variable priorities. Each of these classes is further subdivided into multiple priority levels. Threads that require immediate, e.g. low latency, access to the processor are assigned a priority level within the real time class of priorities. These threads typically appear in communication and game programs, which must be responsive to user, system, or I/O generated inputs. Threads that fall within the variable class of priorities are typically those that can perform their tasks whenever processor resources become available without degrading the responsiveness of the computer system.

For single context processors, e.g. wide issue superscalar processors, SMP systems, and fine-grained MT processors, which execute instructions from one thread at a time, priority-based scheduling algorithms unambiguously determine when and under what circumstances different threads access the processor. Because the processors in these systems handle a single thread context at a time, the speed with which threads are executed will reflect the priorities with which the OS schedules these threads onto the processor. The sole role of the processor is to execute the scheduled thread as fast as possible until the OS intervenes.

The one-to-one relationship between scheduling of a thread by the OS and execution of the thread by the processor does not exist in SMT processor architectures. In particular, the OS can schedule multiple threads onto an SMT processor concurrently. These threads, which may have different priorities, are then executed by the SMT processor according to fetch and issue heuristics implemented by the processor. Since these heuristics are independent of the OS, they do not preserve the thread priorities assigned by the OS, and may actually subvert these priorities.

The present invention is an SMT architecture that extends the impact of OS thread priorities to the SMT processor hardware, and in particular, to the heuristics employed by the SMT processor to select instructions for processing from among the scheduled threads. In this context, "heuristics" are criteria, such as per thread counts of selected events, that are employed by an SMT processor to determine, for example, the efficiency with which a thread is being executed. In effect, the present invention adjusts the heuristics associated with each thread to reflect the thread's priorities. Instructions are then selected for processing from among the threads, according to these priority-adjusted heuristics. The following paragraphs describe a sample of the heuristics employed to monitor the execution dynamics of threads.

A relatively simple heuristic is round robin prioritization, where the processor fetches a selected number of instructions from among the scheduled threads on a rotating basis. For example, consider a 4-issue SMT processor on which the OS has scheduled three threads. In one type of round robin scheme, the processor selects up to 4 instructions from the first thread on the first clock cycle, and any instructions slots unfilled by the first thread may be populated with instructions from a second thread. On the next clock cycle, up to four instructions may be selected from the second thread, and any unfilled slots may be populated with instructions from a third thread.

Threads typically have a limited number of instructions that can be executed concurrently, so there are relatively few clock cycles on which all four instruction slots will be filled from a single thread. The degree to which a thread's instructions can be executed concurrently is referred to as instruction level parallelism (ILP). In single context processors, a lack of ILP in the executing thread leads to horizontal waste, i.e. unfilled execution slots on many clock cycles. SMT processors reduce horizontal waste by filling unused execution slots with instructions from different threads, increasing the number of instructions executed per cycle. In the round robin example above, all three threads are viewed equally, so the processor does not preserve the OS priorities of the threads.

Many heuristics are designed to identify efficiently executing threads to maximize the number of instructions processed per clock cycle (IPC). In these cases, the SMT processor includes logic to implement the efficiency heuristic. This logic is often a per thread counter that tracks the number of specified events generated by each thread. For example, one indicator of efficient processing is accurate branch prediction for the thread. This may be tracked by counting the number of outstanding, e.g. unresolved, branch instructions in the processor pipeline for the thread. A relatively small number of outstanding, unresolved branches in the pipeline for a given thread means that branches are being accurately predicted, and the likelihood of pipeline stalls attributable to branch mispredictions is decreased.

Other indicators of efficient processing include the number of data cache misses generated by a thread and the number of outstanding instructions in the processor pipeline from a given thread. Relatively few data cache misses mean the thread is less likely to be delayed while data is accessed from main memory. A relatively small number of outstanding instructions for a thread may also indicate that the thread's instructions are being retired by the processor, rather than accumulating in the pipelines while cache misses are remedied or branches are resolved. These efficiency heuristics are provided for illustration, and are not intended to be an exhaustive list.

Applied directly, these fetch and issue heuristics and others like them can frustrate an OS's priority-based scheduling scheme by reordering scheduled threads independent of their OS priorities. For example, a high priority thread that generates substantial data cache misses or branch mispredictions would be disfavored by an efficiency heuristic that counted cache misses per thread or outstanding branches per thread, respectively. SMT processors employ these types of heuristics to optimize the total instruction throughput for all scheduled threads, independent of the priority of individual threads.

Simply prioritizing the hardware resources (contexts) used to store processor state data for different threads, e.g. program counters and file registers, and assigning threads to different contexts according to their OS priorities does not effectively address this issue. Because a thread's priority is fixed according to the resources that hold its context data, there is no way to alter thread selection criteria to reflect the execution state of the threads. In particular, parameters that track the efficiency of thread execution such as cache miss counts, unresolved branch counts, and outstanding instruction counts are not considered when selecting instructions for execution. In this scheme, OS priority is over-weighted and the significant efficiency-optimizing features of SMT processor heuristics are ignored. In addition, the livelock problems discussed above may arise.

The present invention provides an architecture in which the execution dynamics of a thread, as measured by fetch, issue, and retirement heuristics of the SMT processor, can be adjusted according to the thread's OS priority, to provide a dynamic priority for the thread. The dynamic priority provided by the present invention thus incorporates the notion of priority-based scheduling into the heuristics implemented by the processor hardware. As a result, the instruction throughput of high priority threads (critical instruction streams) is maximized without significantly impacting the total instruction throughput of all scheduled threads.

In accordance with the present invention, a hardware priority derived from the OS priority of thread is mapped to a scaling factor through a priority-dependent scaling function. A dynamic priority is then determined by adjusting the heuristic criteria with the scaling factor derived from the thread's OS priority. The resulting dynamic priority allows the SMT processor to bias instruction selection to favor high priority threads that are executing relatively efficiently. In short, the present invention preserves OS priority information for each thread and combines it with heuristics reflecting the execution dynamics of the thread to provide a dynamic priority that reflects both aspects of the thread. Instructions are selected for execution from among scheduled threads according to their dynamic priorities. Suitable scaling functions for coupling these OS and hardware thread characteristics are discussed in greater detail below.

Figure 1:
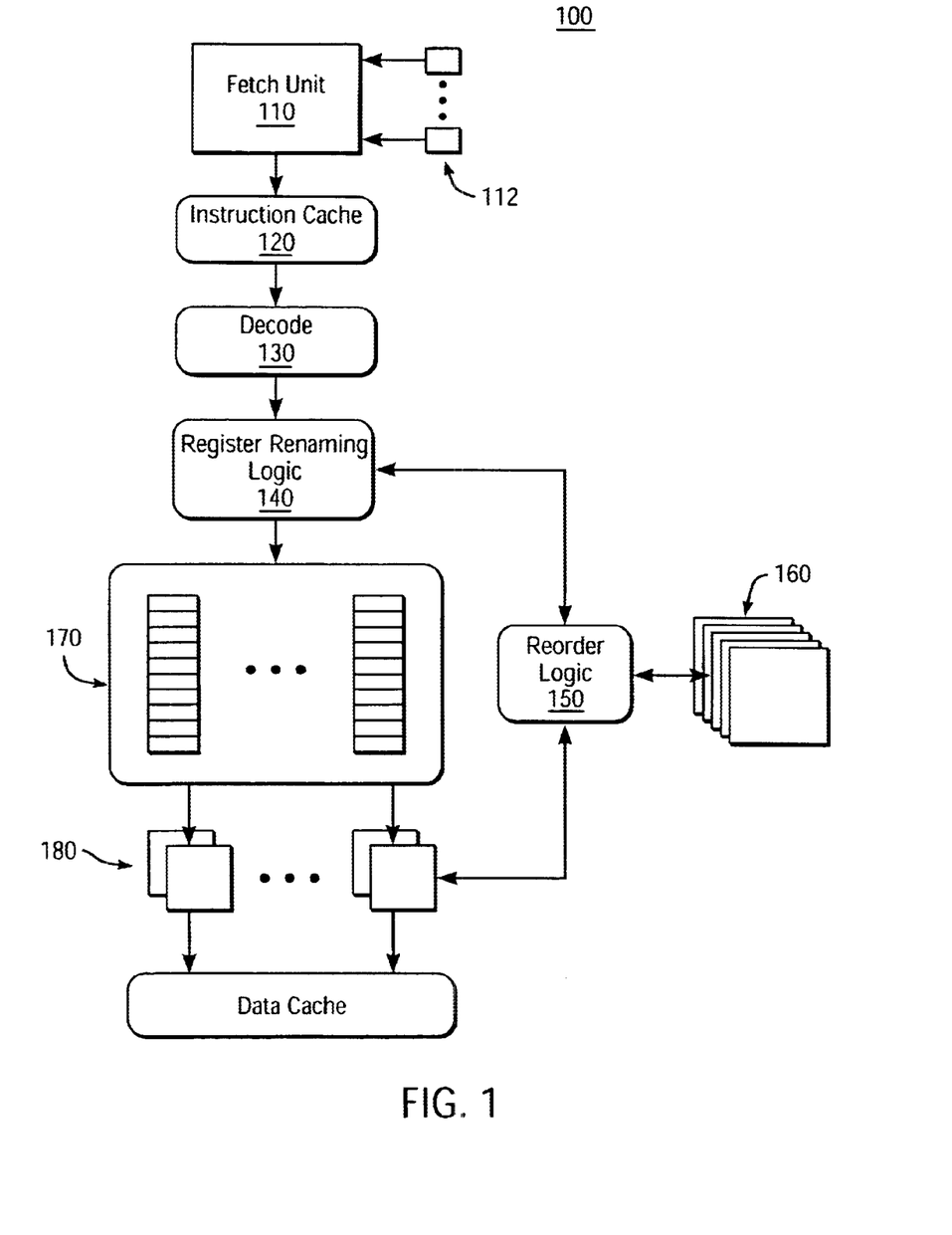
FIG. 1 is a block diagram of one embodiment of an SMT processor in accordance with the present invention.

Referring first to FIG. 1, there is shown a block diagram of one embodiment of an SMT processor 100 suitable for implementing a dynamic priority scheme in accordance with the present invention. Processor 100 comprises a fetch unit 110, a plurality of program counters (PCs) 112, an instruction cache 120, decode logic 130, register renaming logic 140, reorder logic 150, register files 160, instruction queues 170, execution units 180, and a data cache 190.

Each of PCs 112 tracks instruction(s) to be processed for one of the threads currently scheduled on processor 100. In addition, each PC 112 is associated with a register file 160 for tracking the context of the thread. Fetch unit 110 includes logic (not shown) for selecting one or more instructions for processing from among PCs 112. Fetch unit 110 also has access to OS priorities for each thread assigned to one of PCs 112. For example, the OS may write thread priorities to registers (not shown) in fetch unit 110 associated with PCs 112. In another embodiment, priorities derived from OS thread priorities may be written to register file 160. Various other methods and devices for making OS thread priorities available to fetch logic 110 may be employed within the scope of the present invention.

In the disclosed embodiment of SMT processor 100, instructions fetched by fetch unit 110 are stored, temporarily, in instruction cache 120 to await decoding by decoder 130. Register renaming logic 140 analyzes instructions to eliminate any false dependencies and provides data to track instruction status through reorder logic 150. Decoded instructions are loaded into instruction queues 170 according to which resource (execution unit 180) is necessary to implement them. Execution units 180 may include, for example, integer, floating point, memory load/store, and multi-media execution units.

Figure 2A:
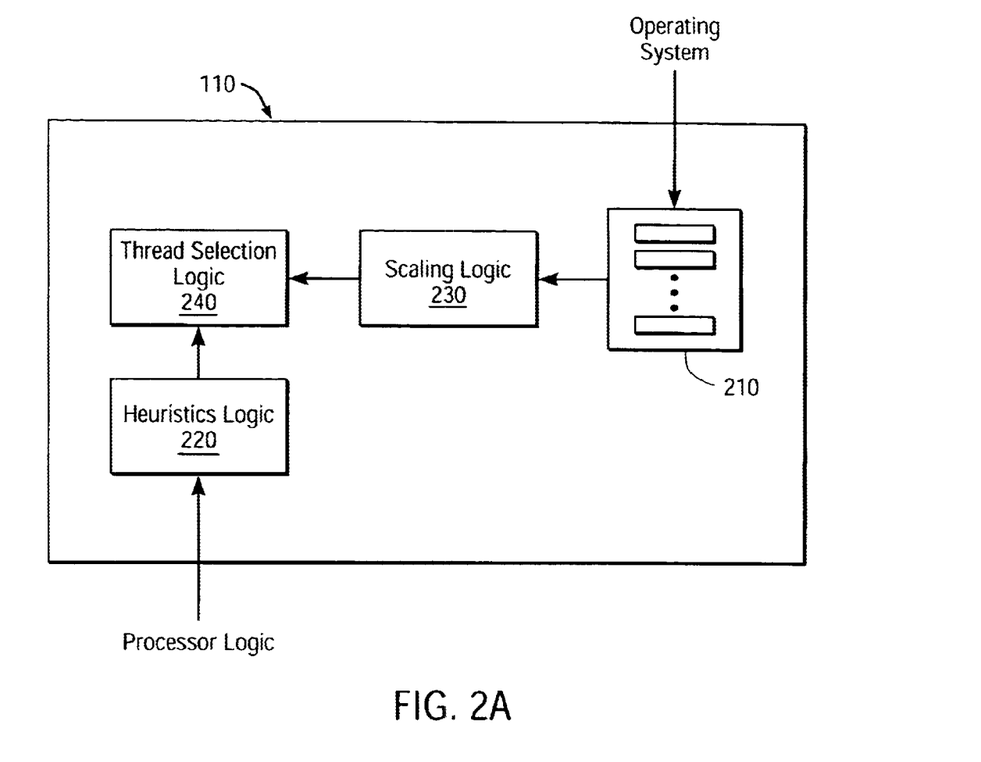
FIG. 2A is a block diagram of one embodiment of the instruction fetch logic of the SMT processor of FIG. 1.

Referring now to FIG. 2A, there is shown a block diagram of one embodiment of fetch unit 110 in accordance with the present invention. In the disclosed embodiment, fetch unit 110 comprises priority registers 210, heuristic logic 220, scaling logic 230, and thread selection logic 240. Priority registers 210 store priority indicators (HW priorities) for each thread currently scheduled on processor. Although FIG. 2A discloses scaling logic 230, heuristic logic 220, and thread selection logic 240 for fetch unit 110, these same logic elements may be implemented to select from one or more threads the instructions to be issued or retired.

As noted above, HW priorities are derived from OS thread priorities. They may be identical to the OS thread priorities, i.e. those used by the OS for scheduling threads onto processor 100, or they may be equivalent indicators of OS thread priority. For example, priorities stored in registers 210 may be more coarse grained than the OS priorities, to save register space and simplify scaling logic 230. These considerations are discussed below in greater detail.

Each of registers 210 is associated with one of PCs 112, which tracks the next instruction(s) for the corresponding thread. In one embodiment of the invention, registers 210 may be implemented as part of PCs 112 and coupled to scaling logic 230. Scaling logic 230 implements a scaling function that determines a scaling factor for each scheduled thread from the HW priority stored in its corresponding priority register 210.

Heuristic logic 220 may implement any of a number of well known heuristics for tracking the state of each scheduled thread on processor 100. These heuristics include counts of data cache misses for each scheduled thread, counts of unresolved branch instructions for each thread, and per thread counts of instructions fetched but not yet issued or issued but not yet retired. In each case, the counts refer to the number of a thread's instructions of the specified type that are in the processor pipeline or in some subset of the pipeline. Per thread count heuristics like these provide an indication of how efficiently the different threads are using the resources of processor 100. Where per thread count heuristics are employed, heuristic logic 220 includes a counter for each event type tracked for each thread, in addition to logic for receiving event data from processor 100. As noted above, the present invention is not limited to these heuristics, which are presented merely for purposes of illustration. Similarly, the elements of FIG. 2A are provided to illustrate the different functions of one embodiment of fetch logic 110. Other logic combinations and organizations of logic that may be employed to provide these functions are within the scope of the present invention. For example, priority registers 210 may be incorporated in PCs 112 and their contents coupled to scaling logic 230 as needed.

Referring still to FIG. 2A, heuristic logic 220 and scaling logic 230 are coupled to thread selection logic 240. Selection logic 240 uses the scaling factor provided by scaling logic 230 and the efficiency indication provided by heuristic logic 220 to calculate a dynamic priority for each thread. The dynamic priority thus reflects both the OS priority of the thread and its dynamic state, e.g. number of outstanding cache misses, unresolved branch instructions, etc. Selection of threads according to the dynamic priority calculated by selection logic 240 thus balances efficiency concerns that impact total instruction throughput with the thread priorities that identify the more important threads to be processed, independent of their efficiency. These issues are illustrated below using different scaling functions and heuristics as examples.

To be effective, a scaling function should: allow the OS to enforce a wide variety of scheduling policies; operate consistently across a range of hardware priorities; be non-zero for all hardware contexts to avoid starvation and livelock; and be computable in hardware with minimal logic. The form of the scaling function used and the manner in which the scaling function is combined with the efficiency (or inefficiency) indicator depends on a number of factors. One factor is whether thread priority, e.g. the speed with which a thread gains access to the processor, increases or decreases with the OS priority assigned to the thread. That is, whether a thread with priority n is scheduled onto the processor before are after a thread with priority n+1. Another factor is whether the efficiency indicator increases or decreases with increasing efficiency of the thread. Still another factor is the desired sensitivity of the thread selection process to the HW priorities of the threads.

In the following discussion, high and low priority refer to the latency with which a thread should be scheduled onto a processor. High priority threads are those that require low execution latencies, e.g. rapid access to processor resources, while lower priority threads are those that can tolerate higher execution latencies, e.g. slower access to the processor's resources. Depending on the OS scheduling policy, high priority may be indicated by lower or higher OS priority values.

As with OS priorities, threads with high dynamic priorities (DPs) are those threads which, on the basis of execution dynamics and OS or HW priority, will be favored by the processor when it selects instructions for execution. Threads having low DPs are those threads that will not be so favored. As discussed below in greater detail, high DP may be indicated by higher or lower values of DP, depending on the heuristic employed by the SMT processor.

Suitable scaling functions include functions having log, linear and higher-order positive and negative dependencies on HW priorities. In the following discussion, scaling functions with positive and negative dependencies are referred to as positive and negative scaling functions, respectively. Positive (negative) scaling functions generate scaling factors that increase (decrease) with increasing HW priority. The use of positive or negative scaling functions depends on whether high priority threads are indicated by high or low HW priority values and whether the measure of thread efficiency increases or decreases with increasing efficiency.

Measures of thread efficiency that increase with increasing efficiency (efficiency indicators) are weighted by positive scaling functions where high priority threads are assigned high values of HW priority. Negative scaling functions are useful for weighting these measures where high priority threads are assigned low values of HW priority. Examples of measures that increase with increasing thread efficiency are per thread counts of instructions retired or executed per cycle or per last n cycles.

Measures of thread efficiency that decrease with increasing thread efficiency (inefficiency indicators) are weighted by negative scaling functions where high priority threads are indicated by high values of HW priority. Where high priority threads are indicated by low values of HW priority, these measures are weighted by positive scaling functions. Examples of measures that decrease with increasing efficiency include the number of unresolved branch instructions, the number of data cache misses, and the number of outstanding instructions (fetched but not executed or executed but not retired) for a thread. Adjusting either measure of thread efficiency (efficiency and inefficiency indicators) by the appropriates scaling functions yields a DP for the thread that reflects both the OS priority and the execution dynamics.

The relationships among the measure of thread efficiency, the dependence of thread priority on the value of HW priority, and type of scaling function are summarized in Table 1.

TABLE 1

|  | HIGH THREAD PRIORITY = HIGH VALUE OF HW PRIORITY | HIGH THREAD PRIORITY = LOW VALUE OF HW PRIORITY |
|---|---|---|
| EFFICIENCY INDICATOR (Higher Values of DP Favored) | positive scaling function | negative scaling function |
| INEFFICIENCY INDICATOR (Lower Values of DP Favored) | negative scaling function | positive scaling function |

Referring now to equations I–IV, there are shown examples of positive and negative scaling functions having both linear and log dependencies.

Positive Scaling Functions $$\frac{p_i + 1}{\sum_{j=1}^{n} (p_i + 1)} \qquad \text{I.(linear)}$$

$$\frac{\log_2(p_i + 1) + 1}{\sum_{j=1}^{n} [\log_2(p_i + 1) + 1]} \qquad \text{II.(log)}$$

Negative Scaling Functions $$\frac{n - p_i}{\sum_{j=1}^{n}(p_j + 1)} \quad \text{III.(linear)}$$

$$\frac{\log_2(n - p_i) + 1}{\sum_{j=1}^{n}[\log_2(p_j + 1) + 1]} \quad \text{IV.(log)}$$

In equations I–IV, n is the total number of contexts that the SMT processor supports, e.g. the maximum number of threads that can be scheduled concurrently on the processor, and $p_i$ is the HW priority of the $i^{th}$ thread. In this embodiment, $0 \leq p_i < n$ for all i.

In one embodiment of the present invention, the DP of a thread is generated by multiplying the thread indicator by the HW-dependent scaling function determined from the thread's HW priority (Equation V).

$$DP(i) = SF(i) \cdot \text{Indicator}(i) \quad \text{V.}$$

Here, DP(i), SF(i), and Indicator(i) are the dynamic priority, scaling factor, and efficiency/inefficiency indicator, respectively, for the $i^{th}$ thread.

In equation V, DP(i) may be viewed as a measure of thread's efficiency/inefficiency that has been scaled to reflect the priority of the thread. For example, when Indicator(i) provides a measure of the thread's inefficiency, i.e. the indicator decreases with increasing thread efficiency, threads having lower values of DP are favored. That is, their instructions are selected for processing over those from threads with higher values of DP. The form of the scaling factor is chosen to offset the impact of a large value of Indicator(i), i.e. inefficient execution, in a manner that increases with the thread's priority. As indicated in Table 1, negative scaling function is suitable where thread priority increases with increasing HW priority values, and a positive scaling function is suitable where thread priority decreases with increasing HW priority values.

When Indicator(i) provides a measure of the thread's efficiency, i.e. the indicator increases with increasing thread efficiency, threads having higher values of DP are favored. In this case, the form of the scaling factor is chosen to augment the value of Indicator(i) in a manner that increases with the thread's priority. A positive scaling factor is suitable where thread priority increases with increasing HW priority values, and a negative scaling function is suitable where thread priority increases with decreasing HW priority values.

One consideration in selecting the form of the scaling function is the ease with which the function may be implemented in logic. In one embodiment of the invention, linear scaling function (Eq. I) may be modified to simplify its logic implementation. Similar modifications may be applied to the anti-linear scaling function with comparable effect. The modified form of Eq. I is:

$$\frac{(p_i + XOR(C \bmod 2, i \bmod 2))}{\sum_{j=1}^{n}(p_j + XOR(C \bmod 2, j \bmod 2))} \quad \text{VI}$$

Here, C represents any convenient value that alternates between even and odd values on sequential clock cycles, such as the cycle count register that is available on Pentium™ processors by Intel Corporation. If n is a power of two, and A is 0 or 1, it can be shown that:

$$\sum_{j=1}^{n}((j-1) + XOR(A, i)) = 2^{(2m-1)}. \quad \text{VII}$$

Here, $A = C \bmod(2, i)$ and $m = \log_2(n)$. Thus, if each thread has a unique priority, i.e. $i \neq j$ implies $p_i \neq p_j$, the denominator of the linear scaling function (Eq. VI) is a power of two related to the total number of contexts that the processor handles. Thus, the denominator of Eq. VI is determined by the processor design and can be readily implemented in logic by right shifting the numerator by a fixed number (2m−1) of bits.

For a processor that can issue, fetch, or retire k instructions per clock cycle, the scaling function, e.g. Eq. VI, may be multiplied by $\log_2(k)$ to ensure that the scaling factors are integer values. This left shift may be combined with the right shift representing the denominator of Eq. VI in a single shift operation For example, in a 4 issue superscalar SMT processor capable of handling 4 contexts simultaneously, the shifts due to multiple instruction issue and the denominator of Eq. VI may be implemented as a single right shift of $(2m-1)-\log_2(k)=3-2=1$ bits. In this embodiment of the invention, the logic equation for the dynamic priority is given by:

$$DP(i) = \text{rightshift}((p_i + XOR(C \bmod 2, i \bmod 2) * \text{Indicator}(i), 1\text{Eq. VIII}$$

Here, rightshift(A,B) is a logic function that shifts B-bits to the right by the value represented by A. In this embodiment, the rightshift is done last to preserve significant digits. Eq. VIII is a relatively simple function to implement in logic, since it requires only a single multiplication for each thread.

Figure 2B:
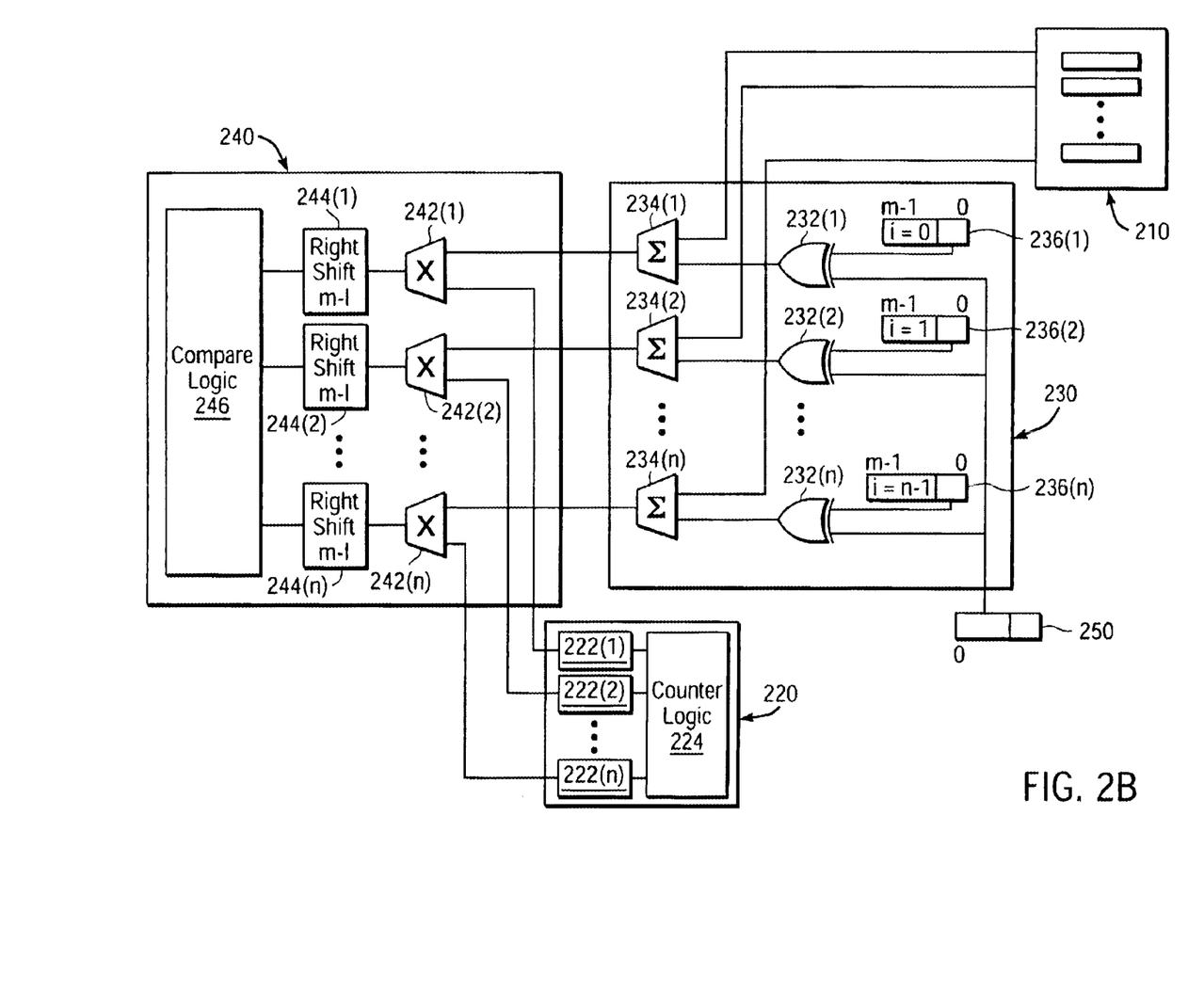
FIG. 2B is a more detailed diagram of one embodiment of the scaling, heuristic, and thread selection logic of FIG. 2A.

Referring now to FIG. 2B, there is shown an embodiment of scaling logic 230, heuristic logic 220, and thread selection logic 240 to implementing equation VIII for an n-context, k-issue SMT processor, where $n=2^m$ and $k=2^1$. Scaling logic 230 includes an exclusive OR (XOR) gate 232, sum logic 234, and m-bit register 236 for each thread or hardware context supported by processor 110. Each XOR gate 232 has one input coupled to the first bit of cycle count register 250 and a second input coupled to the first bit of associated m-bit register 236 to implement the XOR of Eq. VIII. Sum logic 234 implements the addition of the output of XOR gate 232 and HW priority register 112 in Eq. VIII.

Heuristic logic 220 includes a heuristic register 222 for each context and counter logic 224 that determines an (in)efficiency indicator for each register. Other types of (in)efficiency indicators employ different logic 224 for determining thread efficiency.

Thread selection logic includes multiply logic 242 and rightshift logic 244 for each thread/context. Multiply logic 242 implement the multiplication indicated in Eq. VIII. Accordingly, each multiply logic 242 has one input coupled to heuristic register 222 and a second input coupled to the output of sum logic 234. Rightshift logic 244 implements the right shift of Eq. VII and couples it to compare logic 248, which identifies the thread(s) having high DP(s).

The boundaries separating the various logic elements of FIG. 2B into scaling logic 230, heuristic logic 220, and thread selection logic 240 are included for illustration only. The logic elements may be organized according to any of a variety of factors, including, for example, minimizing signal propagation delay, signal interference, or silicon die area.

The following example illustrates how HW/OS priorities, scaling functions, and efficiency indicators are combined in the present invention to provide a dynamic priority for thread selection in an SMT processor. For purposes of this illustration, the OS implements an arbitrary priority-based scheduling scheme and assigns HW priorities (p) to reflect OS thread priorities. The SMT processor is assumed to support two hardware contexts (n=2) and the HW priorities (p) are represented by a single bit. The latter factor means that the OS thread priorities are mapped to two HW priorities. In the example, these HW priorities are p=1 for higher priority threads, i.e. those that the OS has designated for favored access to the processor, and p=0 for lower priority threads, i.e. those that the OS has not designated for favored access to the processor. Thus, thread priority increases with increasing HW priority value.

In the current example, the indicator is a per thread count of the number of outstanding branch instructions in the pipeline and is represented by Bcount(i) for the $i^{th}$ thread. Bcount(i) is a measure of thread inefficiency, since Bcount(i) increases with increasing thread inefficiency. Accordingly, threads are prioritized by the processor in order of decreasing dynamic priority, and ties, i.e. equal values of DP for the two threads, are resolved using two different criteria, round robin and OS priority. In this example, DP(i)=SF(i)·Bcount(i), and the scaling factor (SF) for the $i^{th}$ thread is determined using a (non-normalized) anti-linear scaling function, SF(i)= n−p(i), with n=2. For example, a thread A having a high OS priority and a thread B having a lower OS priority, will have HW priorities p(A)=1 and p(B)=0 and scaling factors SF(A)=1 and SF(B)=2. In effect, the anti-linear scaling factor increases the significance of unresolved branch instructions (inefficiencies) in the lower priority thread relative to their significance in the higher priority thread.

In the disclosed embodiment of fetch logic 110, scaling logic 230 implements the anti-linear scaling function, heuristic logic 220 implements Bcount(i), using a value provided by processor 100, and selection logic 240 adjusts Bcount(i) multiplicatively to determine DPs for the threads. Selection logic 240 updates the dynamic priority for the $i^{th}$ thread as DP(i)=SF(i)·Bcount(i) on each clock cycle and indicates which thread has the lowest DP, i.e. which thread(s) provides instructions for the current processor clock cycle. In an alternative embodiment, selection logic may add Bcount(i) and SF(i) to determine the dynamic priority for thread (i).

TABLE 2

| Cycle | Bcount (A) | DP(A) | Bcount (B) | DP(B) | PW + OS Ties | PW + RR Ties | H + OS Ties |
|---|---|---|---|---|---|---|---|
| 0 | 0 | 0 | 0 | 0 | A | A | A |
| 1 | 1 | 1 | 0 | 0 | B | B | B |
| 2 | 1 | 1 | 1 | 2 | A | A | A |
| 3 | 2 | 2 | 1 | 2 | A | B | B |
| 4 | 2 | 2 | 1 | 2 | A | A | B |

For the current example, the status of threads A and B on successive cycles is summarized in Table 2. In the table, PW+OS Ties represents results obtained when priority weighted heuristics are employed and ties are resolved in favor of the thread having the higher OS priority. PW+RR Ties represents results obtained when priority weighted heuristics are employed and ties are resolved by round robin selection. H+OS Ties represents results obtained with heuristics only and ties resolved in favor of the thread having the higher OS priority. It is noted that tie breaking criteria other than those discussed here may be employed within the scope of the present invention.

On clock cycle 0, assuming neither thread (A or B) has any unresolved branch instructions in the pipeline, DP(a)=0, DP(b)=0, and instructions are first fetched from thread A. In one embodiment of the invention, instructions may be fetched for thread B, the thread with the lower dynamic priority, if instruction slots unfilled remain after all independent instructions from thread A have been exhausted. That is, if thread A lacks sufficient ILP to populate all instruction slots for a cycle, instructions from thread B may be selected.

On clock cycle 1, a branch instructions enters the pipeline for thread A. Following this clock cycle, DP(A)=1 and DP(b)=0, and instructions will be fetched from thread B on clock cycle 2. On clock cycle 2, an unresolved branch instruction is generated for thread B, so that Bcount(A)= Bcount(B)=1, and DP(A)=1, DP(B)=2. In this case, instruction selection begins with thread A again on the next clock cycle (3). Moreover, if another unresolved branch instruction occurs for thread A on cycle 3, DP(A)=DP(B)=2. In one embodiment of the invention (PW+OS Ties), the tie is resolved in favor of the thread having the higher OS or HW priority, which is thread A. In an embodiment that resolves ties by round robin selection (PW+RR Ties), B gets priority on the next clock cycle. Thus, even though branch A has two unresolved branch instructions in the pipeline and, according to the branch count efficiency criteria, is not using processor resources as efficiently as branch B, its higher HW priority, as reflected in its lower scaling factor, is sufficient to ensure that it retains control of the processor. This is apparent in clock cycle 4 where, in the absence of additional branches, the heuristics only approach select instructions first from the lower priority thread.

Note that in the five clock cycles tracked, instructions from thread A, the highest priority thread, are given priority for 4 of the 5 cycles when dynamic priority with OS tie breaking (PW+OS Tie) is used and 3 of 5 cycles when dynamic priority with RR tie breaking (PW+RR Tie) is used. When heuristics are used without priority weighting, thread B is given preferential treatment (higher priority on 3 of 5 cycles).

Figure 3A:
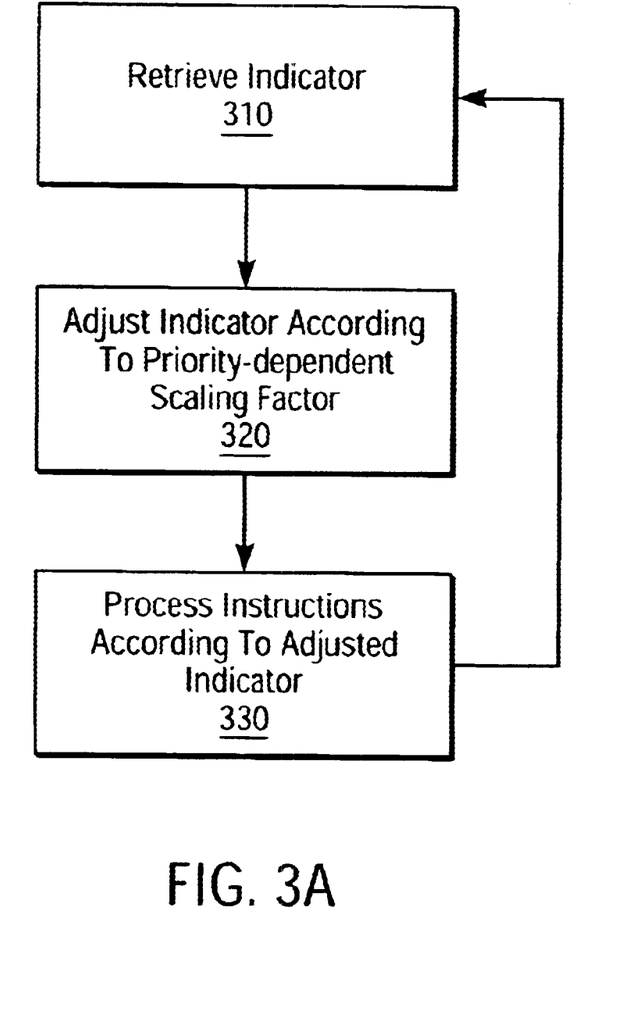
FIG. 3A is a flowchart providing an overview of one embodiment of an instruction fetch method implemented by the logic of FIG. 2.

Referring now to FIG. 3A, there is shown a flowchart summarizing a method 300 implemented by SMT processor 100 for determining a dynamic thread priority in accordance with the present invention. Since the HW priority is set when the thread is scheduled onto SMT processor 100 (FIG. 1), the scaling factor need only be calculated once. Thereafter, on each clock cycle, the indicator selected to monitor each thread's execution dynamics is retrieved 310 and adjusted 320 by the scaling factor to reflect the relative priority of the thread. The resulting dynamic priority is used to determine 330 which thread(s) will provide instructions for processing on the clock cycle.

Figure 3B:
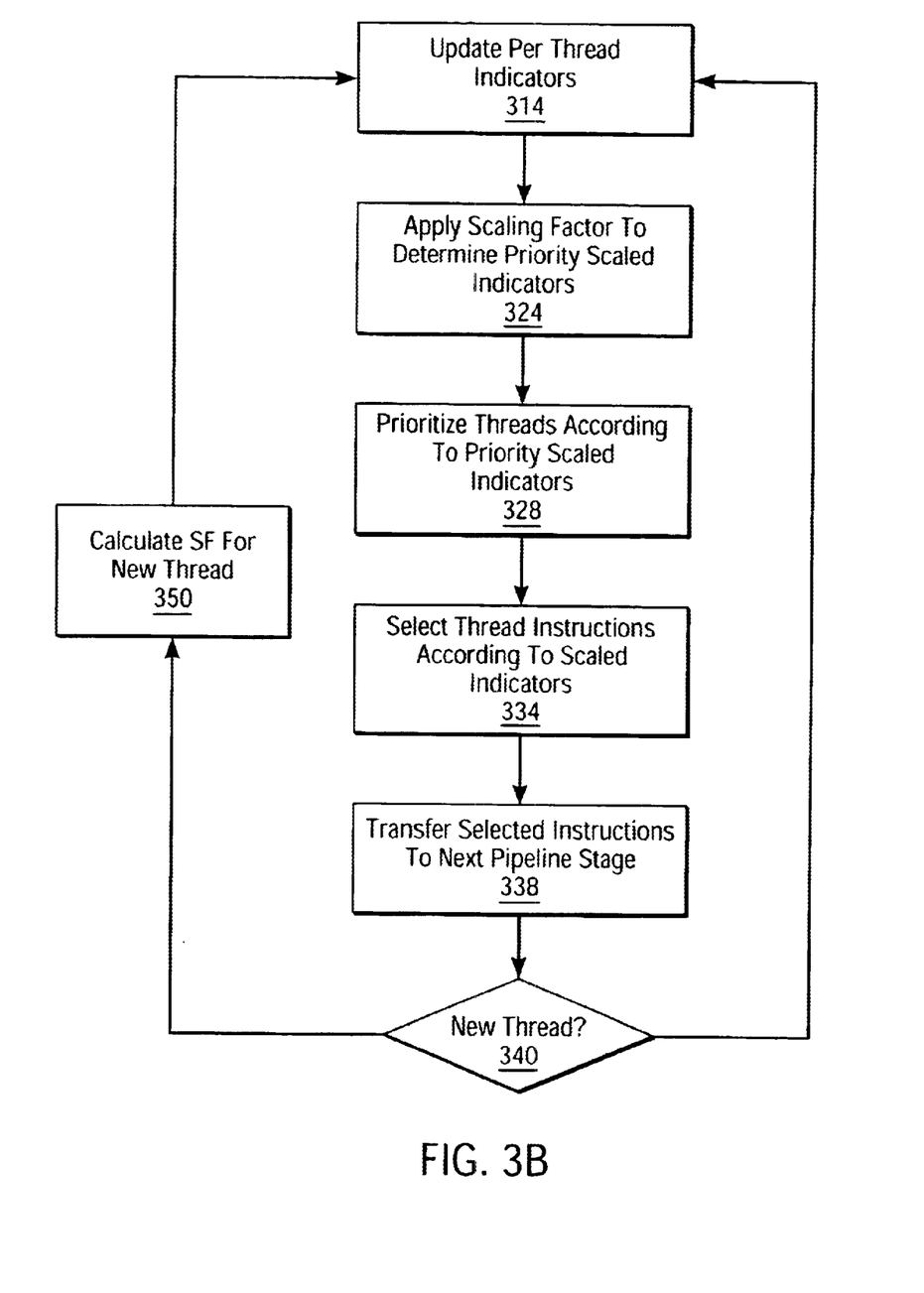
FIG. 3B is a more detailed flowchart of a method in accordance with the present invention for assigning a dynamic priority to a thread.

Referring now to FIG. 3B, there is shown a more detailed flowchart of an embodiment of method 300 implemented by SMT processor 100 in accordance with the present invention. The method is presented for the case where thread execution dynamics are monitored through per thread counts of execution parameters, e.g. numbers of unresolved branch instructions, cache misses, or outstanding instructions. Following each clock cycle, per thread counts are updated 314 to reflect any changes to the thread parameters generated by instructions executed on the previous clock cycle. Scaling factors for each scheduled thread are then applied 324 to the corresponding per thread counts to determine a dynamic priority for each scheduled thread.

Once dynamic priorities have been determined, the processor selects 334 instructions for processing on the next clock cycle according to the determined dynamic priorities. These instructions are transferred 338 to the processor pipeline and the process is repeated for the next clock cycle.

Following instruction transfer 338, it is determined 340 whether any new threads have been scheduled for execution. If so, the scaling factor for the new thread is determined 350 and process 300 returns to step 314. If no new threads are detected 340, process 300 returns directly to step 314.

A variety of selection schemes may be implemented to process threads according to the dynamic priorities. For example, all instruction slots may be reserved for instructions from the thread having the highest dynamic priority on each cycle. This approach ensures that, on a per clock cycle basis, instructions from the thread having both relatively high efficiency and high priority are favored for processing, and in conjunction with the rapid context switching of SMT processors (essentially no penalty for context switches), provides an efficient, priority sensitive SMT architecture.

Since most threads have limited ILP, the above embodiment of the instruction selection scheme is likely to leave instructions slots unfilled on many clock cycles. In another embodiment of the present invention, instructions may be selected from multiple threads on each clock cycle, in accordance with their dynamic priorities. For example, instructions are first selected from the thread with the highest dynamic priority. If any instructions slots remain unfilled by this thread, instructions may be selected from the thread having the next highest dynamic priority. Other embodiments of the invention may employ additional criteria, such as selecting no more than two instructions from any one thread, or selection instructions from no more than three threads per clock cycle. These and other instruction selection criteria may be implemented in conjunction with the dynamic priority scheme of the present invention.

As noted above, HW priorities need not be identical to the priorities employed by the OS for scheduling threads onto SMT processor 100, as long as the HW priorities reflect the OS priorities consistently. One factor to be considered in selecting a priority resolution, e.g. the number of bits used to represent different HW priorities, is the cost in silicon of supporting the additional bits, and the cost in processing time of calculating scaling factors using the selected number of bits. For example, an SMT processor 100 that supports up to n hardware contexts, i.e. n threads, can simply assign HW priorities between 0 and n−1 to the scheduled threads, according to the OS priorities of the threads. An 8 context SMT processor would require three bits to track these priorities. However, since many OSs have substantially more priority levels, e.g. a total of 32 for the Windows NT® OS, the mapping of OS priorities to HW priorities eliminates priority information, and reduces the priority resolution of the system. That is, some of the OS's control of scheduling would be diluted. On the other hand, supporting all OS priority levels would increase the silicon cost of the present invention from 3 to 5 or more bits per thread just for HW priority tracking.

Another factor to be considered in deciding on a priority resolution is that a context switch, i.e. scheduling of a new thread onto the SMT processor, in a low resolution priority scheme is likely to require the recalculation of scaling factors for more threads than in the high resolution scheme. In the former scheme, for example, when the newly scheduled thread is higher in priority than the already scheduled threads, the scaling factors of the already scheduled threads will have to be recalculated. In the high granularity (resolution) scheme, it is more likely that the newly scheduled thread can be added and its priority accurately reflected without adjusting the scaling factors of the already scheduled threads.

There has thus been provided a system and method for extending thread priorities to SMT architectures, while preserving the execution sensitive heuristics used to enhance instruction throughput in these architectures. Scaling factors are determined from HW priorities, which are related to the priorities used by the OS to schedule threads onto the processor. Efficiency criteria, such as per thread counts of execution parameters, are tracked for each clock cycle. Dynamic priorities for each thread are determined adjusting the heuristic for each thread with a corresponding scaling factor. Instructions are then selected for processing according to the dynamic priority.

What is claimed is:

1. A method for selecting instructions for processing in a simultaneous multithreaded processor, the method comprising:

scheduling threads to execute on the processor according to respective priorities assigned to the threads by an operating system;

monitoring indications of execution efficiency for the threads scheduled on the processor;

adjusting the monitored indications by a function of the assigned priorities to provide dynamic priorities for the scheduled threads, the dynamic priorities to reflect the operating system-assigned priorities and execution dynamics of the scheduled threads; and assigning instructions from the scheduled threads to execution slots of the processor according to their dynamic priorities.

2. The method of claim 1, wherein assigning comprises:

comparing the dynamic priorities of the scheduled threads; and selecting instructions from among the scheduled threads for processing according to a selection criterion.

3. The method of claim 2, wherein selecting instructions comprises selecting instructions from the scheduled threads having the highest dynamic priorities.

4. The method of claim 2, wherein selecting instructions comprises:

selecting instructions from the scheduled thread having the highest dynamic priority when one thread has a higher dynamic priority than any other scheduled threads; and selecting instruction from among the scheduled threads having the highest dynamic priorities according to a second criterion, when more than one scheduled thread has the highest dynamic priority.

5. The method of claim 1, wherein monitoring the execution efficiency indications comprises:

tracking instructions processed for the scheduled threads; and adjusting the indications when selected events are detected among the processed instructions.

6. The method of claim 1, wherein assigning instructions comprises issuing instructions to the execution slots.

7. A simultaneous multi-threaded processor comprising:

a plurality of program counters, each program counter to track instructions to be executed from a thread scheduled on the processor;

a plurality of priority registers to receive an indication of an operating system priority for the thread tracked by an associated program counter;

scaling logic to determine a scaling factor for each scheduled thread according to its indicated operating system priority;

heuristic logic to determine an efficiency with which each scheduled thread is executing; and thread selection logic to determine a dynamic priority for each scheduled thread from the scaling factor and the execution efficiency of the thread, the dynamic priority to bias the thread selection logic to favor high priority threads that are executing efficiently.

8. The system of claim 7, wherein the heuristic logic further comprises a per thread counter for each of the plurality of threads, to track occurrences of selected events for each of the plurality of threads.

9. The system of claim 8, wherein the selected events provide an indication of the efficiency with which a thread is being executed.

10. The system of claim 9, wherein the selected events are selected from the group of events comprising a number of unresolved branch instructions for a thread, a number of data cache misses for the thread, a number of instructions fetched but not executed, and a number of instructions executed but not retired for the thread.

11. The system of claim 7, wherein the scaling logic determines an increasing function of the priority indication of a thread.

12. The system of claim 11, wherein the increasing function is a log, linear, or higher order power of the priority indication.

13. The system of claim 7, wherein the scaling logic implements a decreasing function of the priority indication of a thread.

14. The system of claim 13, wherein the decreasing function is an anti log or an anti-linear or higher power of the priority indication.

15. The system of claim 14, wherein the thread selection logic adjusts a per thread counter by the scaling factor to provide a dynamic priority of the thread.

16. A method for assigning a dynamic priority to a thread comprising:

scheduling the thread to execute on a simultaneous multithreaded processor according to an operating system priority assigned to the thread;

calculating a scaling factor that reflects the thread's operating system priority; and, until the operating system suspends the thread;

monitoring instructions of the thread to determine an execution efficiency;

adjusting the determined execution efficiency by the scaling factor to provide a dynamic priority that reflects the operating system priority and execution dynamics for the thread; and selecting an instruction from the thread for execution, according to the dynamic priority.

17. The method of claim 16, wherein selecting comprises:

comparing the dynamic priorities determined for each thread scheduled on the processor; and giving processing priority to instructions from the thread having the highest dynamic priority.

\* \* \* \* \*

UNITED STATES PATENT AND TRADEMARK OFFICE
CERTIFICATE OF CORRECTION

PATENT NO. : 6,658,447 B2
DATED : December 2, 2003
INVENTOR(S) : Cota-Robles It is certified that error appears in the above-identified patent and that said Letters Patent is hereby corrected as shown below:

Column 7,
Line 43, delete "are", insert -- or --.

Signed and Sealed this

Twenty-third Day of March, 2004

JON W. DUDAS
*Acting Director of the United States Patent and Trademark Office*